(12) United States Patent
Kopf et al.

(10) Patent No.: US 7,592,920 B2
(45) Date of Patent: Sep. 22, 2009

(54) SYSTEMS AND METHODS FOR EVALUATING DRIVER ATTENTIVENESS FOR COLLISION AVOIDANCE

(75) Inventors: Matthias Kopf, Munich (DE); Nima Farid, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 160 days.

(21) Appl. No.: 11/704,261

(22) Filed: Feb. 9, 2007

(65) Prior Publication Data
US 2007/0146146 A1    Jun. 28, 2007

Related U.S. Application Data

(63) Continuation of application No. PCT/EP2005/008655, filed on Aug. 9, 2005.

(30) Foreign Application Priority Data
Aug. 12, 2004 (DE) .................. 10 2004 039 305

(51) Int. Cl.
*G08B 23/00* (2006.01)
(52) U.S. Cl. ............... 340/576; 340/575; 340/425.5; 701/1; 701/2; 701/300
(58) Field of Classification Search ........... 340/576, 340/575, 425.5, 439, 435, 436; 180/271; 342/72; 701/300, 1, 2; 700/229; 716/5
See application file for complete search history.

(56) References Cited

U.S. PATENT DOCUMENTS 5,465,079 A * 11/1995 Bouchard et al. .......... 340/576

| | | | |
|---|---|---|---|
| 6,293,361 B1 | 9/2001 | Mueller | |
| 6,502,908 B1* | 1/2003 | Mueller et al. | 303/191 |
| 6,879,969 B2* | 4/2005 | Engstrom et al. | 706/20 |
| 6,925,425 B2* | 8/2005 | Remboski et al. | 702/188 |
| 7,253,724 B2* | 8/2007 | Prakah-Asante et al. | 340/439 |
| 7,283,056 B2* | 10/2007 | Bukman et al. | 340/575 |
| 2003/0011481 A1* | 1/2003 | Bjorkman | 340/576 |

(Continued)

FOREIGN PATENT DOCUMENTS

DE    43 09 606 A1    9/1994

(Continued)

OTHER PUBLICATIONS

International Search Report dated Nov. 3, 2005 including an English translation of the pertinent portions (Four (4) pages).

(Continued)

*Primary Examiner*—Davetta W Goins
*Assistant Examiner*—Hoi C Lau
(74) *Attorney, Agent, or Firm*—Crowell & Moring LLP

(57) ABSTRACT

Systems and method for evaluating driver attentiveness are provided. An allocation unit evaluates defined first input data to recognize a specific driving situation among a plurality of defined driving situations. A driver monitoring unit is operatively coupled to the allocation unit and evaluates defined second input data, based on the recognized driving situation, to assess a degree of situation-adapted attentiveness. A functional unit of a collision avoidance system is controlled as a function of the assessed degree of situation-adapted attentiveness.

21 Claims, 3 Drawing Sheets

U.S. PATENT DOCUMENTS

2003/0167123 A1* 9/2003 Nakazawa et al. .......... 701/301
2004/0102884 A1* 5/2004 Tange et al. ................... 701/48
2006/0109094 A1* 5/2006 Prakah-Asante et al. .... 340/435

FOREIGN PATENT DOCUMENTS

| DE | 198 01 009 C1 | 4/1999 |
| DE | 100 39 795 A1 | 3/2002 |
| DE | 101 32 386 A1 | 1/2003 |
| DE | 103 11 518 A1 | 11/2003 |
| EP | 0 549 909 B1 | 8/1996 |
| JP | 3224858 A | 10/1991 |

OTHER PUBLICATIONS

German Office Action dated Mar. 3, 2005 including an English translation of the pertinent portions (Seven (7) pages).

* cited by examiner

SYSTEMS AND METHODS FOR EVALUATING DRIVER ATTENTIVENESS FOR COLLISION AVOIDANCE

CROSS REFERENCE TO RELATED APPLICATIONS

This application is a continuation of PCT International Application No. PCT/EP2005/008655, filed Aug. 9, 2005, which claims priority under 35 U.S.C. § 119 to German Patent Application No. 10 2004 039 305.2, filed Aug. 12, 2004, the entire disclosures of which are herein expressly incorporated by reference.

BACKGROUND AND SUMMARY OF THE INVENTION

The present invention relates generally to evaluating driver attentiveness and, more particularly, to a device for evaluating the attentiveness of a driver in a collision avoidance system in motor vehicles with an electronic control device.

It is generally known that collision warning systems are controlled as a function of the alertness of a driver. Furthermore, there exist a plurality of systems for detecting the alertness of a driver and a plurality of collision avoidance systems, e.g., with an emergency braking action. For example, a collision avoidance system with braking action dependent on the alertness of the driver is disclosed in the DE 198 01 009 C1.

With conventional collision avoidance systems, warnings may be given or action may be taken, when the driver does not deem them to be necessary, since the driver has already recognized the hazardous situation.

An aspect of the invention involves improving collision avoidance systems in terms of driver acceptance. Consistent with the present invention, an electronic control device for evaluating driver attentiveness in a motor vehicle is provided. The motor vehicle may have a collision avoidance system. The electronic device may comprise: an allocation unit that evaluates defined first input data to recognize a driving situation among a plurality of defined driving situations; and a driver monitoring unit operatively coupled to the allocation unit, the driver monitoring unit evaluating defined second input data to assess a degree of situation-adapted attentiveness based on the recognized driving situation, wherein at least one functional unit of the collision avoidance system is controlled by the electronic control device as a function of the assessed degree of situation-adapted attentiveness.

Examples of some potential and defined driving situations are an open road situation, a tailgating situation, a follow-on driving situation, a passing or lane change situation, a panic braking situation, a cutting-in situation and/or, if desired, also combinations of such situations. The defined first input data are, for example, the environmental and/or vehicle-related data, such as the distance to the lead vehicle (target object), the vehicle speed/acceleration/deceleration of one's own vehicle and/or of the target object and/or the steering angle. The defined second input data, which may also be to some extent the same data as the defined first input data, are in particular the data related to the driver's behavior, such as the driver's handling of the steering wheel by measuring the steering angle, the driver's application of the gas pedal and/or brake pedal by means of sensors that already exist for this purpose, eye movements or gestures by means of camera sensors, the driver's actuation of the turn signal, manipulation of the radio, etc. Therefore, any input data that may indicate the operational activities of the driver may also be evaluated at the same time. As an alternative or as an addition, the degree of the situation-adapted attentiveness may also be determined by means of other behavioral patterns of the driver, such as the blink frequency of the eyelids or the body activities. Such evaluations are carried out in a well-known manner by means of, for example, camera systems that are disposed in the passenger compartment. Even the pulse of the driver may be determined in a well-known manner by means of suitable sensors disposed in the steering wheel.

Preferably the degree of the situation-adapted attentiveness is assessed or detected based on a number of different attentiveness categories (e.g., diversion criteria, intent criteria, model-based driver behavior criteria, alertness criteria). Evaluations in terms of the use of the radio, the telephone, or the air conditioning system may be put, for example, into the category—diversion criteria—for the purpose of evaluating the attentiveness.

Evaluations in terms of the driver's steering activity, actuation of the turn signal or change in the driver's direction of vision may be put into the category—intent criteria—for the purpose of evaluating the attentiveness. However, these evaluations may also be used for recognizing the driving situation. Evaluations in terms of the time and intensity, with which the gas or brake pedal was applied, or in terms of the transmission selection control (reverse gear changes) in connection with the situation-specific reaction time windows may be put, for example, into the category—model-based driver behavior criteria—for the purpose of evaluating the attentiveness. Evaluations in terms of the blink frequency of the eyelids, body activities or the pulse may be put, for example, into the category—alertness criteria—for the purpose of evaluating the attentiveness.

Consistent with the present invention, the degree of the situation-adapted attentiveness may be divided into three grade levels. For example, the following grade levels may be defined:

I (not in order): the driver is reacting incorrectly.

II (uncertain, decision cannot be made): the driver's reaction is unpredictable or there exists a driving situation, in which a specific reaction of the driver cannot be expected.

III (in order): driver is reacting correctly.

In particular, the degree of attentiveness may also be expressed in the form of a probability with which the driver will react incorrectly (I), in an undefined manner (II), or correctly (III).

Crucial for recognizing a driving situation is the recognition that the driver is aware of this driving situation. That is, the driver has obviously grasped the driving situation (passively caused the driving situation) or even intentionally introduced this driving situation (actively caused the driving situation). This may include the degree of attentiveness, in particular the attentiveness, adapted to this driving situation, in the immediate past.

For example, a (conscious or rather intentional) passing or lane change situation is detected only if in anticipation the driver has steadily decreased (not suddenly) the driving speed, as is typical for such a situation, before reaching a critical distance. Then it is possible to assume that the attentiveness of the driver is adapted to the passing or lane change situation.

In another example, a panic braking situation (of which the driver is consciously aware or which the driver has obviously grasped) is detected only if prior to the application of the brakes and optionally prior to a decrease in the distance to the target object, the driver initially holds constant at least within specific limits the distance to the target object, as is typical for such a situation; and, if necessary, has reacted to the situation with the typical distance and deceleration-related actions within defined reaction periods after the start of the deceleration action of the lead vehicle. Because then one can assume that the driver's attentiveness is adapted to a panic braking situation. If a conscious panic braking situation is detected, the subsequent actions of the driver during this situation may be evaluated as intentional activities.

Upon recognition of such a conscious (intentional) driving situation (of which the driver is consciously aware), the collision avoidance system may be actuated, but less in the sense of a warning or less in the sense of providing assistance.

If the attentiveness is uncertain or scarcely adapted to the situation, it may be assumed in the above situations that the tailgating situation is unintentional or that the driver is unaware of the tailgating situation or has not grasped this situation. This situation will lead to the collision avoidance system being actuated more in the sense of a warning or in the sense of providing assistance.

Collision avoidance systems are defined as both collision warning systems (with optical, acoustical or haptic warning functions) and as actively engaging collision prevention systems (with automatic braking or steering action). One problem with collision avoidance systems is that, unlike the inattentive driver, the attentive driver does not require any warning or action at all or requires it later. If the attentive driver receives frequent warnings or action during or before a hazardous situation, which he himself has already recognized, the acceptance and hence compliance with the collision avoidance system may experience a steep decline.

It is known that collision warning systems are actuated as a function of the driver's alertness. Furthermore, a plurality of systems for detecting the driver's alertness exist. However, conventional systems do not consider that, first, in different driving situations a varying degree of driver attentiveness is required for the correct reaction and that, second, in different driving situations it would be wise to choose from a plurality of different input data for the purpose of determining the driver's attentiveness. An aspect of the present invention involves determining the driver's attentiveness based on the driving situation. This assessment of the driver's attentiveness is based on the decision whether in a given driving situation the driver is reacting or will react (with high probability) correctly or incorrectly. In this respect, the relevant psychological literature refers to this phenomenon as "correct situational awareness."

Other objects, advantages and novel features of the present invention will become apparent from the following detailed description of the invention when considered in conjunction with the accompanying drawings.

BRIEF DESCRIPTION OF THE DRAWINGS

The invention is explained in detail below with reference to the attached drawings. In the drawings.

DETAILED DESCRIPTION OF THE DRAWINGS

The following description refers to the accompanying drawing. The implementations set forth in the following description do not represent all implementations consistent with the claimed invention. Instead, they are merely some examples of implementations consistent with the invention. Other implementations may be used and structural and procedural changes may be made without departing from the scope of present invention.

Figure 1:
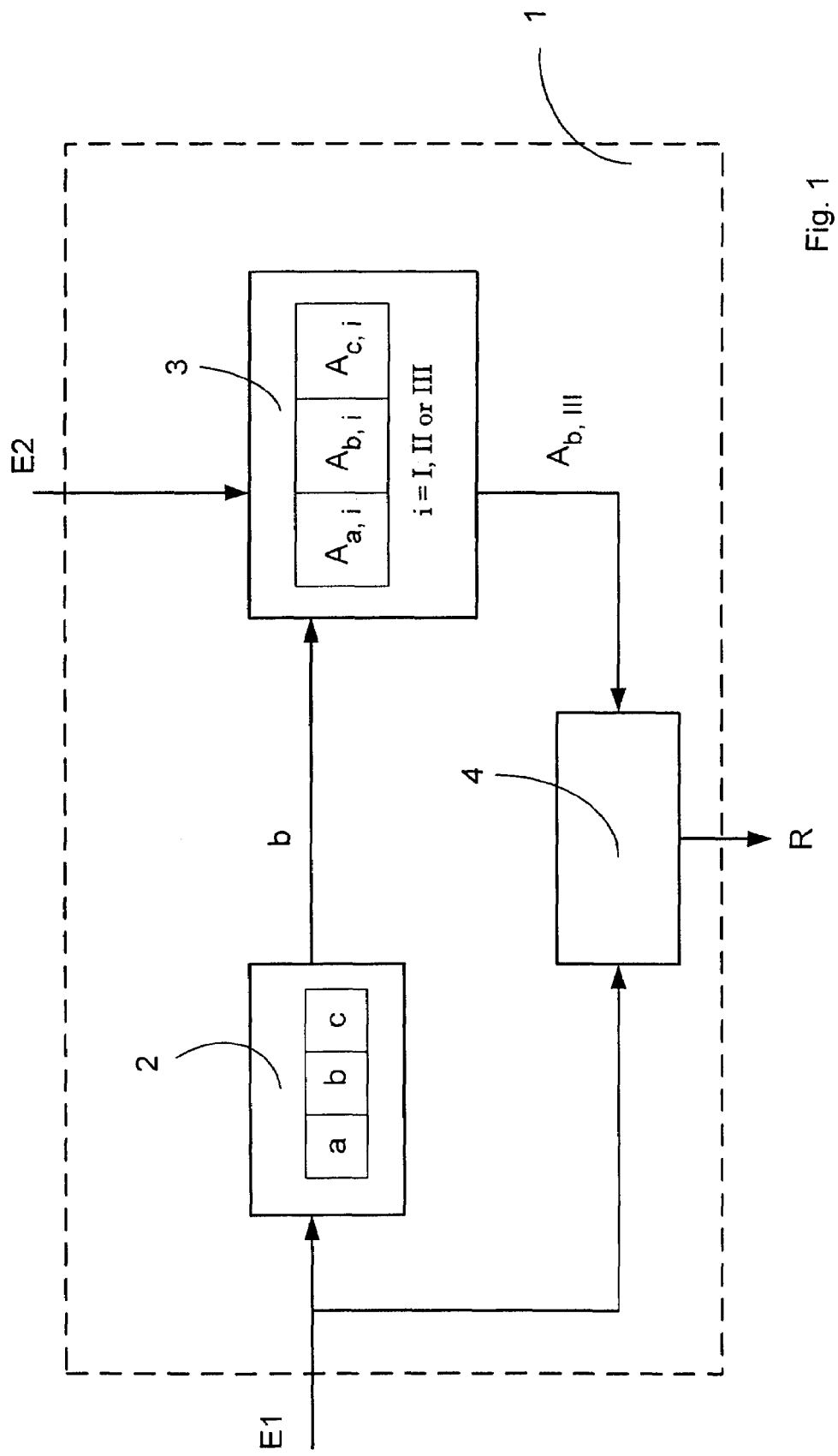
FIG. 1 is a schematic representation of exemplary system components and information flow consistent with the present invention.

An electronic control device 1, which is assigned to a collision avoidance system (of which only a detail is shown here in FIG. 1), comprises an allocation unit 2, which evaluates defined first input data E1 of the control unit 1 in terms of the recognition of a specific driving situation among a plurality of possible defined driving situations a, b or c. As an example, the driving situation "a" is a tailgating situation, the driving situation "b" is a follow-on driving situation and the driving situation "c" is a lane change situation.

The defined first input data E1 are, for example, information about the steering angle, the distance to the lead vehicle, the gas pedal angle and the brake pedal application force. In the example depicted in FIG. 1, the driving situation b, thus a follow-on driving situation, has been detected by the allocation unit 2 by evaluating these first input data.

In a follow-on driving mode, it can be expected of the driver in terms of a correct reaction, for example, that by applying the gas pedal and brake pedal, he will maintain either a speed, by means of which the distance to the lead vehicle does not drop below a critical threshold, or that he introduces a passing maneuver by suitably actuating the turn signal, applying the gas pedal and handling the steering wheel. These expected reactions are checked in the driver monitoring unit 3, which is connected to the allocation unit 2 and which evaluates the defined second input data E2, based on the detected driving situation b in terms of assessing the degree of a situation-adapted attentiveness $A_{b,i}$.

The degree of the situation-adapted attentiveness $A_{b,i}$ is recognized by means of the input data E2. Therefore, the driver's operating activities that are relevant for the detected driving situation b are monitored. In addition, the degree of the situation-adapted attentiveness $A_{b,i}$ may also be determined, as stated above, by other behavioral patterns of the driver. For example, the degree of the situation-adapted attentiveness $A_{b,i}$ may be detected based on the following attentiveness categories: Diversion criteria: in terms of the use of devices that are not necessary for the expected correct reaction, such as use of the radio or the telephone; model-based driver behavior criteria: such as releasing the gas pedal and/or applying the brake pedal at the situation-specific correct time; alertness criteria: the speed, with which the gas pedal is released and/or degree, to which the brake pedal is applied.

Based on the evaluation of the second input data E2, the degree of the situation-adapted attentiveness $A_{b,i}$ (where i=I, II or III) is assigned to one of the above-described grade levels: I (wrong reaction), II (uncertain reaction) or III (correct reaction).

To this end, algorithms, mathematical statistical models, tables or maps and data-related thresholds are stored in a well-known manner in the control device.

In the present example, the situation-adapted attentiveness $A_{b,iii}$, which is the output signal of the driver monitoring unit 3 and the input signal of the functional unit 4 of the collision avoidance system, has been determined. In principle, when the attentiveness is assigned to grade level III, the functional unit 4 does not activate either a warning or an action.

Preferably, there is not only a functional unit 4 for actuating an actuator R, but also a plurality (not illustrated here) of functional units, such as a function unit "acoustic warning" for actuating a first actuator, and a functional unit "acceleration or deceleration action" for actuating a second or third actuator. Depending on the degree of the situation-adapted attentiveness, the functional units may be actuated and/or re-parameterized individually or jointly.

For example, a variety of different acoustical warning signals (e.g., different in terms of loudness, frequency or power-on time) or action commands of varying intensity may be sent in principle as a function of the grade levels I, II, III. However, the actuation of the functional units is dependent preferably not only on the grade level, but also on the recognized situation. For example, in the event that the attentiveness $A_{b,i}$, which is assigned to the follow-on driving situation (driving situation b), is assigned to grade level I (wrong reaction), the functional units are actuated differently than in the event that the attentiveness $A_{c,i}$, which is assigned to the lane change situation (driving situation c), is assigned to grade level I.

For example, in a first driving situation, where the situation-adapted attentiveness is assigned to grade level I, a first functional unit and a second functional unit may be activated; and in a first driving situation, where the situation-adapted attentiveness is assigned to grade level II, only a first functional unit may be actuated. However, as an alternative or in addition, the functional units may also be actuated differently as a function of the grade level in terms of the degree of reaction (e.g., in driving mode b at grade level I intensive braking action and in driving mode b at grade level II slight braking action).

Figure 2:
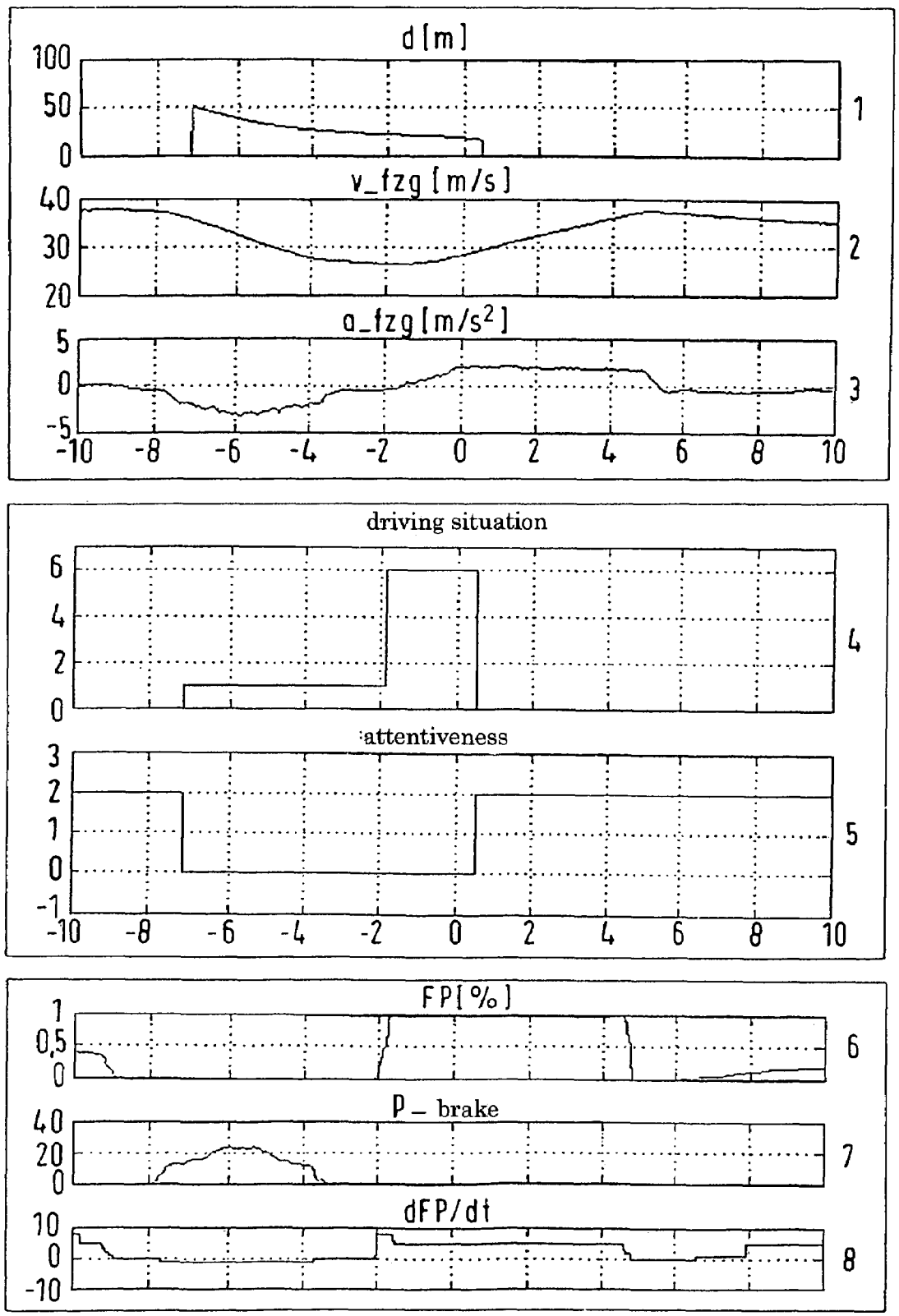
FIG. 2 depicts an exemplary embodiment of the present invention in connection with a passing situation as a recognized driving situation.
Figure 3:
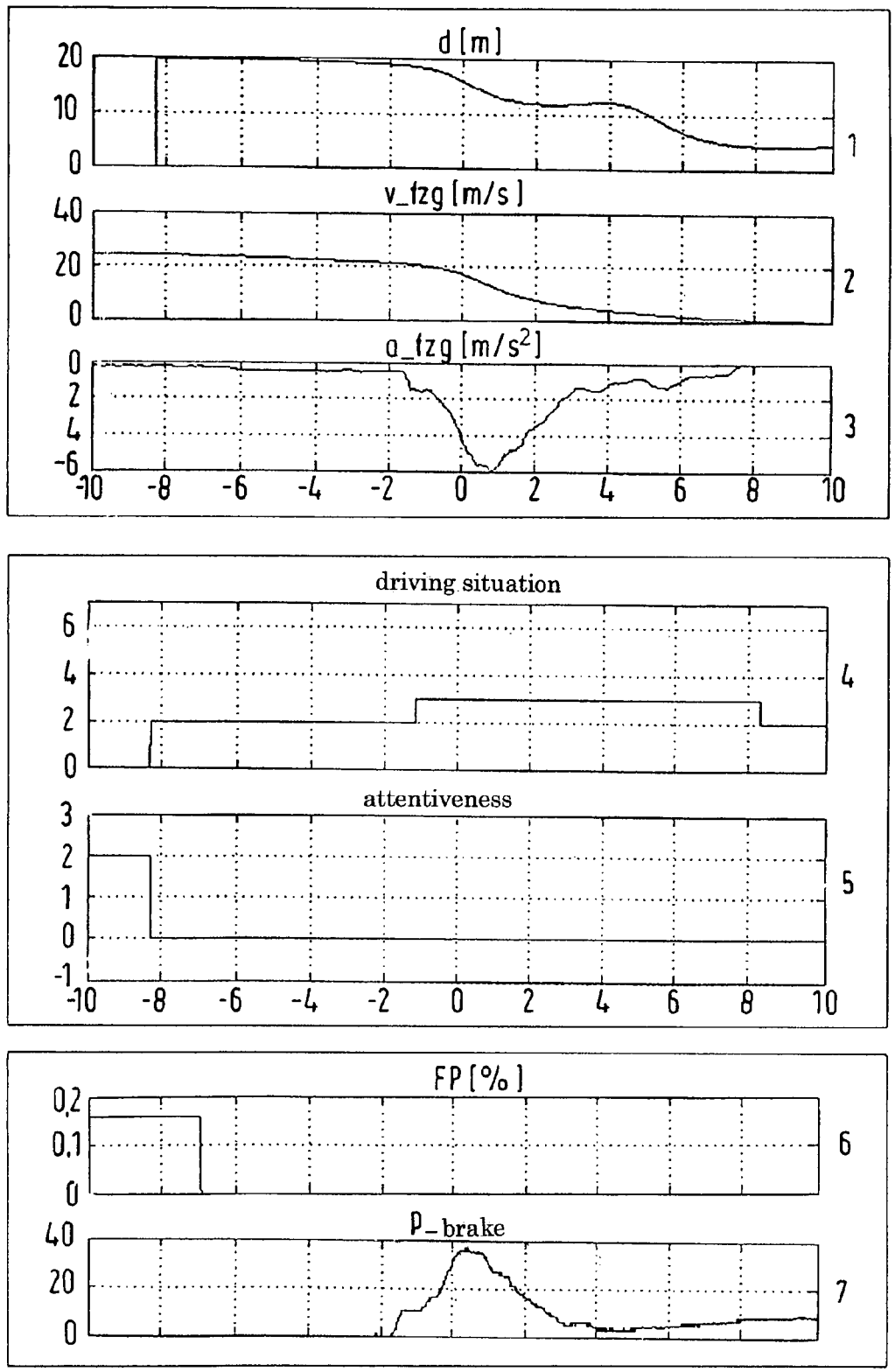
FIG. 3 depicts an exemplary embodiment of the present invention in connection with a panic braking situation as a recognized driving situation.

The first three graphs [1], [2], and [3] of FIG. 2 and FIG. 3 show over time the distance d of one's own vehicle from the target object, one's own vehicle speed v_fzg and one's own vehicle acceleration a_fzg. This information and, if necessary, other information, such as the relative speed and/or the relative acceleration with respect to the target object, are, for example, the input data E1 of the allocation unit 2.

The last three graphs [6], [7] and [8] of FIG. 2 and FIG. 3 show over time the driving pedal angle FP in a range between 0% (minimum power request) and 100% (maximum power request), the braking pressure p_brake and the gradient of the driving pedal angle dF/dt (shown only in FIG. 2, not in FIG. 3). This information and, if necessary, other information are, for example, the input data E2 of the driver monitoring unit 3.

The two graphs [4] and [5] in the middle of FIG. 2 and FIG. 3 show the detected driving situation and the degree of attentiveness. In graph [5], the value 0 corresponds to grade level III (correct reaction); the value 1, the grade level I (wrong reaction); and the value 2, the grade level II (uncertain reaction) with respect to the driver's attentiveness. In graph [4], for example, the value 0 corresponds to a recognized open road situation; the value 1, a recognized tailgating situation; the value 2, a recognized follow-on situation; the value 3, the recognized panic braking situation; and the value 6, a recognized (intentional) passing or lane change situation. The value 4 could, for example, be assigned to a cutting-in situation; and the value 5, to a pulling-out situation in relation to the target object.

FIG. 2 shows a passing situation as an example of a recognized driving situation in order to explain in detail exemplary operation of the allocation unit 2 and the driver monitoring unit 3.

FIG. 2 shows, for example, that an open road situation has been recognized, since no target object was detected at a distance d of less than 50 m (see graph [1]). Therefore, the degree of attentiveness is given initially a value of 2 (uncertain).

After the open road situation, a (conscious) tailgating situation is recognized, according to FIG. 2, since a target object was detected at a distance d of less than 50 m. At the same time the attentiveness of the driver was recognized to be high (correct reaction), since before the instant, at which the distance d dropped below 50 m, the driver already released the driving pedal (FP=0%) and then built up a braking pressure p_brake. Therefore, it is recognized that the driver was aware of the tailgating situation. Thus, for example, in this tailgating situation, a warning may be suppressed since the defined safety distance d was not reached.

After the (conscious and/or intentional) tailgating situation, a passing or lane change situation $A_{b,i}$.recognized, according to FIG. 2, because a positive vehicle acceleration a after a short constant driving mode and a maximum gradient dF/dt of the driving pedal application were detected. This passing or lane change situation is also categorized as conscious and/or intentional, because before reaching a critical distance the driving speed v_fzg was reduced at a steady rate in anticipation (first of all, release of the driving pedal FP in graph [6], thereafter buildup of a brake pressure p_brake in graph [7]). Therefore, the situation-adapted attentiveness was categorized as high in this case. Here, too, for example, a warning can be suppressed since a defined safety distance d was not reached or since a lane change was detected.

If, for example, based on an initially conscious tailgating situation, the attentiveness was rated as low or uncertain; and then a vehicle acceleration after a short constant driving mode and a maximum gradient dF/dt of the driving pedal application were determined, no conscious or intentional passing or lane change situation, but rather an unintentional tailgating would be detected; and hence, a warning would be activated, since in this case there is no situation-adapted attentiveness.

FIG. 3 shows a panic braking situation as an example of a recognized driving situation in order to explain in detail further exemplary operation of the allocation unit 2 and the driver monitoring unit 3.

First, for example, an open road situation (value 0) is detected, according to FIG. 3, because no object was recognized at a distance d of less than 50 m (see graph [1]). The degree of attentiveness is given initially the value 2 (uncertain).

After the open road situation, a tailgating situation (value 1) is detected, according to FIG. 3, only for a very short period of time, since a target object was detected at a distance d of less than 50 m. However, the detection of a tailgating situation changes immediately to a follow-on driving situation (value 2), since the distance d remains constant (see graph [1]). Since the driver was already maintaining a constant speed v_fzg beforehand and continues to hold this speed constant, the degree of the follow-on situation-adapted attentiveness is rated as high (value 0, correct reaction). It is assumed that the driver is aware of the follow-on driving situation.

Next the driver releases the driving pedal (FP=0%), before the distance d decreases even more. Before applying the brake or rather before building up the brake pressure p_brake, the driver holds the distance to the target object constant. Therefore, once the brakes are applied, it can be assumed that the driver's attentiveness is adapted to the panic braking situation. Finally, the driver applies the brake, before the distance d has decreased significantly and adjusts the brake pressure p_brake to the decreasing distance d. A panic braking situation (value 3), which is either conscious or apparently grasped by the driver, is detected, since once the situation-adapted attentiveness is recognized, the vehicle speed v_fzg is simultaneously adjusted to the distance d in that the driver applies the brakes. Here too, for example, a warning may be suppressed since a defined safety distance d has not been reached. If prior to the application of the brakes and the decrease in distance d, the degree of attentiveness had been uncertain or low, an unconscious tailgating situation would have been detected, instead of a conscious panic braking situation.

Therefore, in particular, the input data E2 of the immediate past and/or the attentiveness in the immediate past is generally considered preferably in order to evaluate a driving situation, based on the input data E1.

Collision avoidance systems may be improved in terms of the customer acceptance criteria by means of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic control device for evaluating driver attentiveness in a motor vehicle, the motor vehicle having a collision avoidance system, the electronic device comprising:
    an allocation unit that evaluates defined first input data to recognize a driving situation among a plurality of defined driving situations; and
    a driver monitoring unit operatively coupled to the allocation unit, the driver monitoring unit evaluating defined second input data to assess a degree of situation-adapted attentiveness based on the recognized driving situation,
    wherein the degree of situation-adapted attentiveness is expressed as a likelihood with which a driver has introduced the driving situation intentionally, based on the situation-adapted attentiveness adapted to the driving situation in the immediate past,
    wherein at least one functional unit of the collision avoidance system is controlled by the electronic control device as a function of the assessed degree of situation-adapted attentiveness.

2. The device of claim 1, wherein the allocation unit recognizes that the driver is aware of the recognized driving situation based on a recognition of a degree of driving situation-adapted attentiveness in the immediate past.

3. The device of claim 1, wherein the degree of situation-adapted attentiveness is assessed by means of the second input data, which indicates operational activities of the driver.

4. The device of claim 1, wherein the degree of situation-adapted attentiveness is assessed based on at least one attentiveness category selected from: a diversion criteria, a driver intent criteria, a model-based driver behavior criteria, and an alertness criteria.

5. The device of claim 1, wherein the degree of situation-adapted attentiveness is divided into three grade levels.

6. The device of claim 5, wherein the three grade levels include:
    a first grade level indicating incorrect driver reaction;
    a second grade level indicating unpredictable driver reaction; and
    a third grade level indicating correct driver reaction.

7. The device of claim 1, wherein an intentional passing or lane change situation is detected only if the driver has steadily decreased a driving speed before reaching a critical distance to a target object.

8. The device of claim 1, wherein a panic braking situation, of which the driver is aware, is detected only if the driver initially holds constant at least within specific limits a distance to a target object prior to an application of brakes.

9. The device of claim 8, wherein the panic braking situation is detected only if the driver initially holds constant at least within specific limits the distance to the target object prior to an application of brakes and prior to a decrease in the distance to the target object.

10. The device of claim 1, wherein the allocation unit is configured to recognize at least one of an open road driving situation, a tailgating driving situation, a follow-on driving situation, a passing driving situation, a lane change driving situation, a panic braking driving situation, and a cutting-in driving situation.

11. The device of claim 1, wherein the first data includes at least one of environmental data and vehicle-related data.

12. The device of claim 11, wherein the vehicle-related data includes at least one of a distance to a target object, vehicle speed, vehicle acceleration, vehicle deceleration, target object deceleration, and steering angle.

13. The device of claim 11, wherein the second data includes data related to driver behavior.

14. The device of claim 13, wherein the driver monitoring unit comprises at least one sensor for sensing the driver behavior data.

15. The device of claim 13, wherein the data related to driver behavior includes at least one of data related to the driver's handling of a steering wheel, data related to the driver's application of a gas pedal, data related to the driver's application of a brake pedal, data related to the driver's actuation of a turn signal, and data related to the driver's manipulation of a radio.

16. The device of claim 13, wherein the data related to driver behavior includes data related to bodily activity of the driver.

17. A method for evaluating driver attentiveness in a motor vehicle, the motor vehicle having a collision avoidance system, the method comprising the acts of:
    evaluating first input data to recognize a driving situation among a plurality of defined driving situations;
    evaluating second input data to assess a degree of situation-adapted attentiveness based on the recognized driving situation; and
    controlling at least one functional unit of the collision avoidance system as a function of the assessed degree of situation-adapted attentiveness,
    wherein the degree of situation-adapted attentiveness is expressed as a likelihood with which a driver has introduced the driving situation intentionally, based on the situation-adapted attentiveness adapted to the driving situation in the immediate past.

18. The method of claim 17, wherein evaluating first input data comprises evaluating the first input data to recognize at least one of an open road driving situation, a tailgating driving situation, a follow-on driving situation, a passing driving situation, a lane change driving situation, a panic braking driving situation, and a cutting-in driving situation.

19. The method of claim 17, wherein evaluating first input data comprises evaluating at least one of environmental data and vehicle-related data, and wherein evaluating second input data comprises evaluating data related to driver behavior.

20. The method of claim 17, wherein evaluating second input data to assess a degree of situation-adapted attentiveness comprises:
    assessing the degree of situation-adapted attentiveness as at least one of incorrect driver reaction, unpredictable driver reaction, and correct driver reaction.

21. The method of claim 17, wherein evaluating second input data comprises: assessing the degree of situation-adapted attentiveness as at least one of a probability of incorrect driver reaction, a probability of unpredictable driver reaction, and a probability of correct driver reaction.

* * * * *